United States Patent

Jauregui et al.

[11] Patent Number: 6,144,732
[45] Date of Patent: Nov. 7, 2000

[54] TELEPHONE CASE WITH EASILY RECONFIGURED PUSHBUTTON KEYS

[75] Inventors: Mario E. Jauregui, San Bruno; Simon N. Ancri, Palo Alto, both of Calif.

[73] Assignee: Teledex Corporation, San Jose, Calif.

[21] Appl. No.: 09/067,472

[22] Filed: Apr. 27, 1998

[51] Int. Cl.$^7$ .................................................. H04M 1/00
[52] U.S. Cl. ........................................ 379/368; 379/428
[58] Field of Search ................................ 379/428, 435, 379/433, 447, 451, 437, 368

[56] References Cited

U.S. PATENT DOCUMENTS

| | | | |
|---|---|---|---|
| 3,927,282 | 12/1975 | Firstenberg | 179/178 |
| 4,160,136 | 7/1979 | McGough | 379/368 |
| 4,280,025 | 7/1981 | Carlberg | 179/189 D |
| 4,355,211 | 10/1982 | Steiner | 179/90 K |
| 4,764,770 | 8/1988 | Church . | |
| 4,845,748 | 7/1989 | Bohannon | 379/368 |
| 4,930,157 | 5/1990 | Citron et al. | 379/433 |
| 4,947,569 | 8/1990 | Brooks et al. | 40/337 |
| 5,130,629 | 7/1992 | Kuhfus | 379/429 |
| 5,130,897 | 7/1992 | Kuzma | 362/24 |
| 5,172,805 | 12/1992 | Gumb | 200/341 |

FOREIGN PATENT DOCUMENTS

0396963A2  11/1990  European Pat. Off. .

OTHER PUBLICATIONS

Anonymous, "Changeable Array Keyboard", IBM Technical Disclosure Bulletin, vol. 11, No. 5, p. 524, XP002113233, New York, U.S., Oct. 1968.

*Primary Examiner*—Jack Chiang
*Attorney, Agent, or Firm*—Burns Doane Swecker & Mathis L.L.P.

[57] ABSTRACT

A telephone set comprised of a top part, a bottom part, a cover plate and a plurality of pushbutton keys. The keys fit into a plurality of oversize apertures in the top part and are held in place by the cover plate. A paper underlay is positioned over the cover plate to obscure apertures that do not contain keys. The oversize apertures in the top part allow the pushbutton keys to be removed without separating the top part from the bottom part.

20 Claims, 5 Drawing Sheets

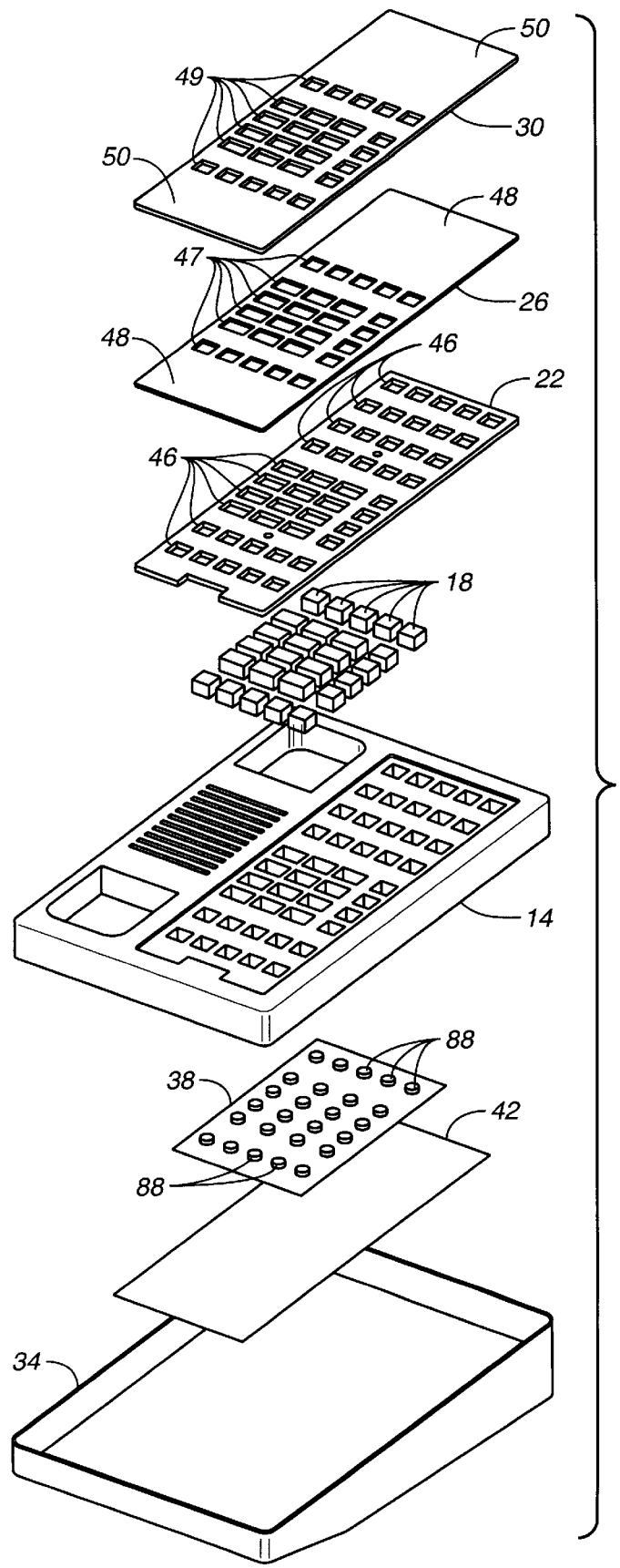
FIG._1

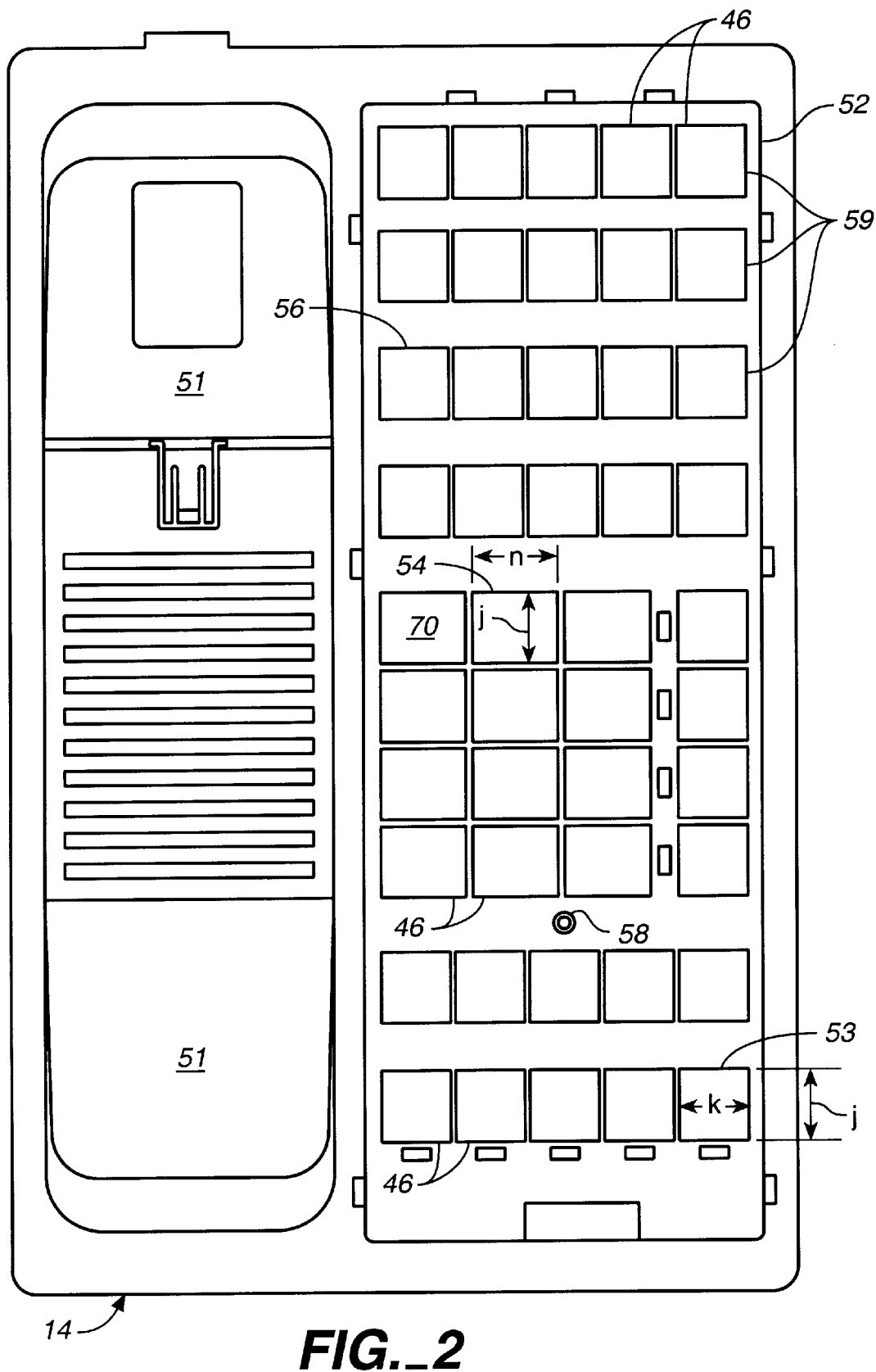
FIG._2

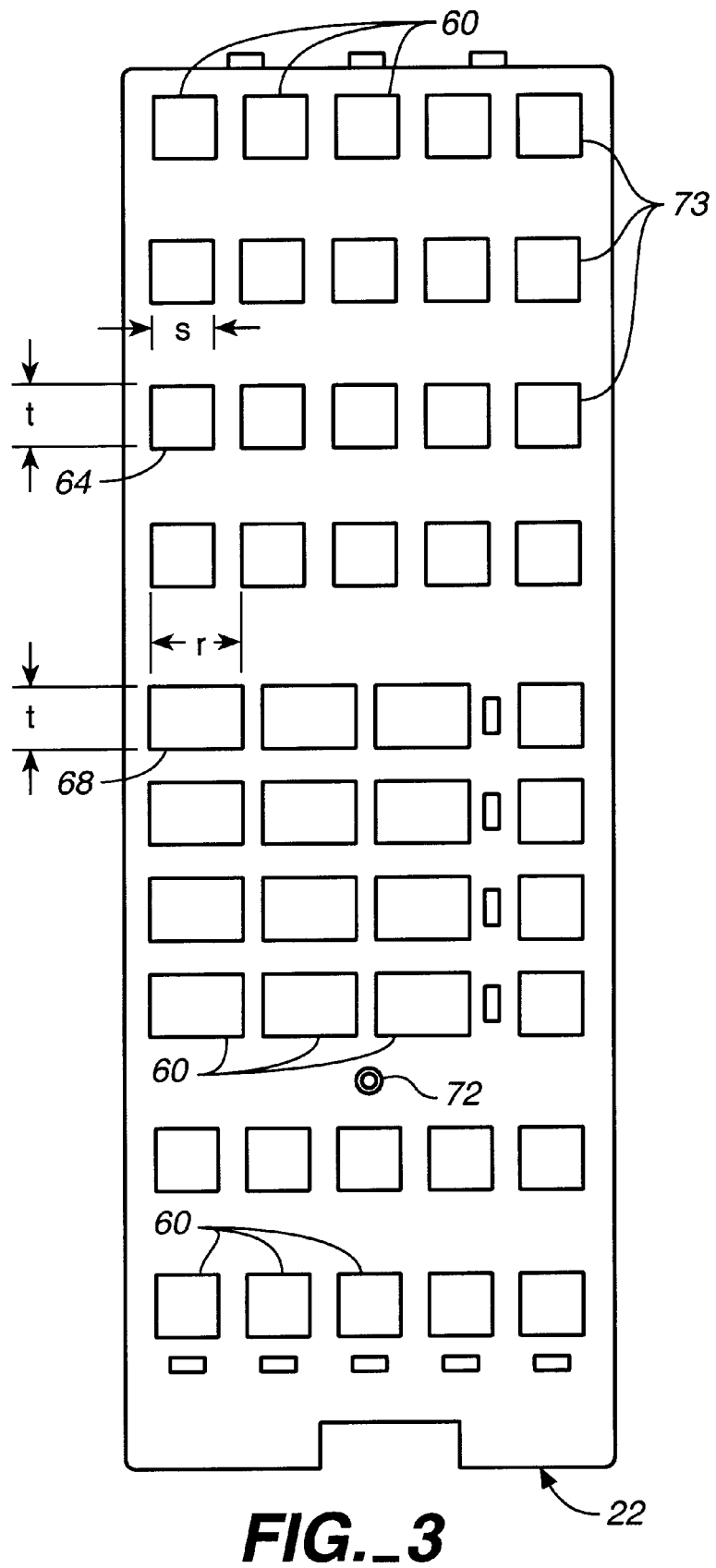
FIG._3

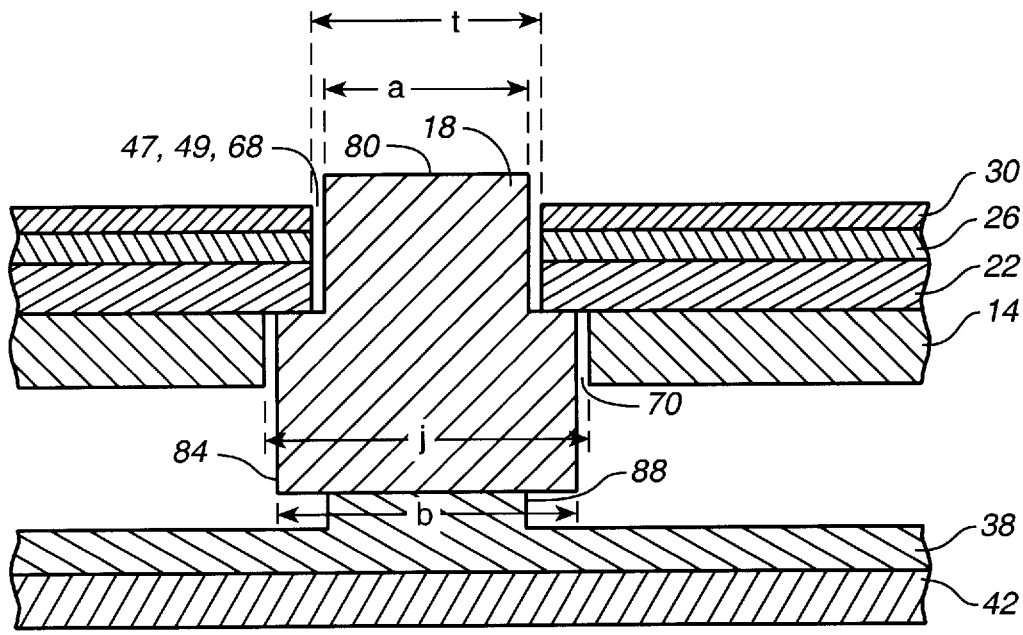
FIG._4
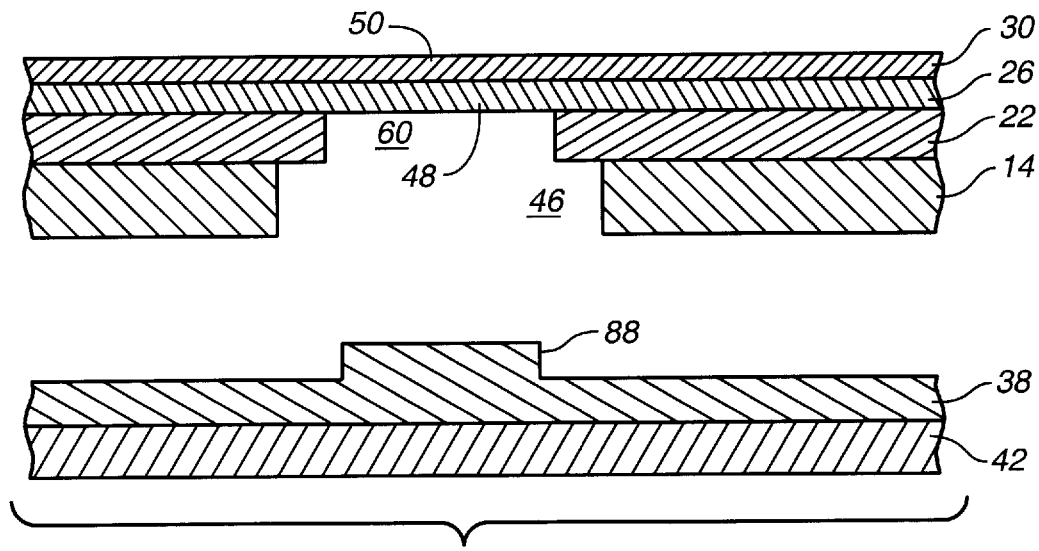
FIG._5

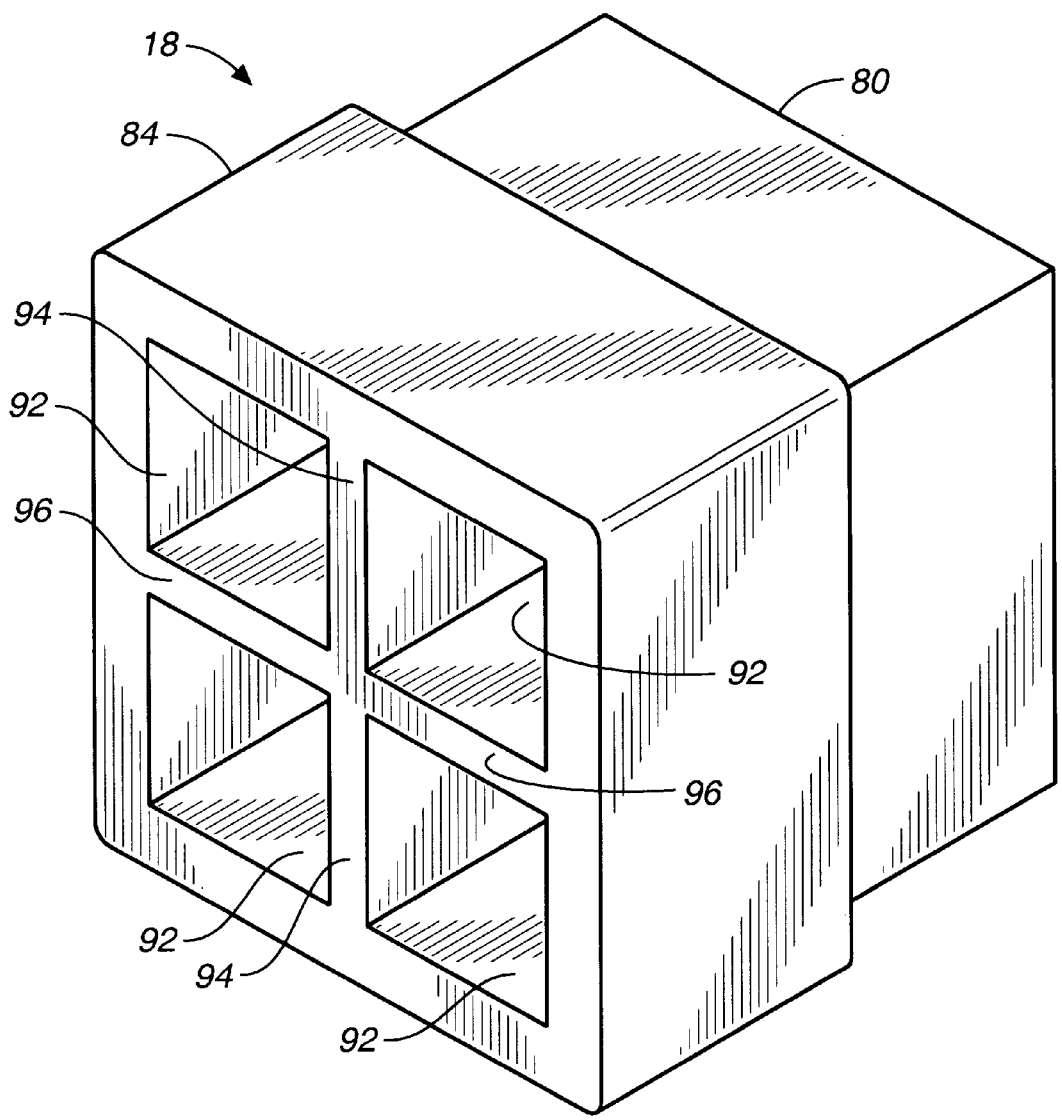
FIG._6

6,144,732

TELEPHONE CASE WITH EASILY RECONFIGURED PUSHBUTTON KEYS

TECHNICAL FIELD

The present invention relates to a case for pushbutton telephones and more particularly to a case in which the arrangement of keys can be altered without completely disassembling or redesigning the case.

BACKGROUND INFORMATION

Lodging establishments, such as hotels and motels, have a need for a large number of telephone sets. Sometimes each room in a lodging will have several telephone sets. Frequently, an establishment will have special requirements for the configuration of the face of the telephone. For example, one row of pushbutton keys may be preprogrammed to connect the user to various in-house services provided by the hotel, such as room service, a health club and a dry cleaning service. Another hotel may offer different services, and therefore need a different configuration of pushbutton keys. Therefore, it is desirable to have a telephone set in which the pushbutton keys can be easily reconfigured.

Telephone sets are known in which the pushbutton keys can be reconfigured. For example, U.S. Pat. No. 5,172,805 discloses a pushbutton and cover assembly that allows the buttons to be removed when the top and bottom parts of the telephone set are separated from each other.

Similarly, U.S. Pat. No. 4,845,748 discloses a telephone structure that does not require fasteners to attach the keypad to the telephone set. U.S. Pat. No. 4,355,211 discloses a pushbutton module in which individual keys can be replaced.

A problem with all of these telephone sets is that the reconfiguration of the keys cannot be accomplished without taking the telephone set apart.

SUMMARY OF THE INVENTION

Briefly, the present invention is a telephone set comprised of a plurality of pushbutton keys, a telephone case and a cover plate positioned over the telephone case. The pushbutton keys have a top part and a bottom part, with the top part having a width that is less than the width of the bottom part.

The telephone case has a plurality of telephone case apertures that extend entirely through the telephone case. Each of the telephone case apertures have dimensions that allow an individual pushbutton key to fit inside of the aperture.

The cover plate is positioned on top of the telephone case and has a plurality of cover plate apertures that extend entirely through the cover plate. Each of the cover plate apertures are positioned over one of the telephone case apertures and have dimensions that allow the top part of the pushbutton key to extend through the cover plate aperture, but which prevent the bottom part of the pushbutton key from extending into the aperture. This prevents the pushbutton key from being withdrawn through the cover plate aperture and secures the pushbutton key in the telephone set.

A paper underlay may be positioned over the cover plate and can include printing that identifies a programmed telephone number that will be dialed when a particular key is pressed. A transparent plastic overlay is positioned over the underlay to protect the underlay from moisture and/or dirt. The underlay and overlay include apertures that allow the pushbutton keys to extend through the underlay and overlay.

An advantage of the present invention is that the pushbutton keys can be removed and reconfigured simply by removing the cover plate, the underlay and the overlay. The telephone case itself does not have to be taken apart. If, for example, a row of keys is not needed on a particular telephone, the row of keys can be removed. The same cover plate is reinstalled on the telephone set, but a new paper underlay is used which covers up the row of unused apertures in the cover plate.

BRIEF DESCRIPTION OF THE DRAWINGS

FIG. 1 is an exploded view of a telephone set according to the present invention;

FIG. 2 is a front view of a telephone case according to the present invention;

FIG. 3 is a front view of a cover plate according to the present invention;

FIG. 4 is a cross-sectional view of part of a telephone set according to the present invention;

FIG. 5 is a cross-sectional view of an aperture that does not contain a key; and FIG. 6 is an isometric view of a key for use in the present invention.

DESCRIPTION OF THE PREFERRED EMBODIMENTS

FIG. 1 illustrates a telephone set 10 comprised of a top case 14, a plurality of pushbutton keys 18 (such as touch tone keys), and a keyboard cover plate 22. An underlay 26 is positioned over the keyboard cover plate 22, and an overlay 30 is positioned over the underlay 26. The top case 14 fits into a bottom case 34. A key mat 38 and a printed circuit board (PCB) 42 are positioned between the top case 14 and the bottom case 34. Each individual key 18 is separate from each other key 18 so that each key 18 is individually removable from the telephone set 10.

The cover plate 22 includes a plurality of apertures 46. The underlay 26 includes a plurality of apertures 47 that are aligned with at least some of the apertures 46. The underlay 26 also includes one or more regions 48 that cover some of the apertures 46 (two of the regions 48 are shown in FIG. 1). Similarly, the overlay 30 includes a plurality of apertures 49 that are aligned with at least some of the apertures 46. The overlay 30 also includes one or more regions 50 that cover some of the apertures 46 and which cover the regions 48 (two of the regions 50 are shown in FIG. 1).

FIG. 2 illustrates that the top case 14 includes a pair of recessed regions 51 for receiving the handset of a telephone and the plurality of apertures 46 for receiving the plurality of keys 18. The region of the case 14 that contains the apertures 46 is referred to as a keypad 52. Each of the apertures 46 extend completely through the top case 14 so that if one of the keys 18 is inserted in one of the apertures 46, the key 18 will be able to make contact with the key mat 38 and will also extend upward through the plate 22, the underlay 26 and the overlay 30.

In the preferred embodiment, not all of the apertures 46 have the same dimensions. For example, an aperture 53 has a width "j" and a length "k," whereas an aperture 54 has a width "n" and the length "j." An aperture 56 has the same dimensions as the aperture 53. The apertures 53, 54 and 56 are each one of the apertures 46. A fastening site 58 is included on the case 14. In FIG. 2, three rows of the apertures 46 have been labeled 59 for reference purposes. In the preferred embodiment, the case 14 is comprised of plastic, such as acrylonitrile butadiene styrene (ABS). The cover plate 22 is also comprised of a plastic, such as ABS.

FIG. 3 illustrates that the keyboard cover plate 22 includes a plurality of apertures 60. In the preferred embodiment, the apertures 60 occur in groups of different sizes. For example, an aperture 64 has the dimensions "s" and "t," whereas an aperture 68 has the dimensions "r" and "t." The apertures 64 and 68 are each one of the apertures 60. The keyboard cover plate 22 is designed to be positioned over the case 14, so that each of the apertures 60 are positioned over one of the apertures 46. For example, when the plate 22 is positioned over the case 14, the aperture 64 is positioned over the aperture 56. Similarly, the aperture 68 will be positioned over an aperture 70, which is one of the apertures 46, and which has the same dimensions as aperture 54.

A fastening site 72 is included on the plate 22 for providing a way to mechanically secure the plate 22 to the case 14. In the preferred embodiment, the fastening site 72 is just a hole through which a fastening means, such as a screw is inserted. The screw is threaded through the site 72 and into the fastening site 58 on the case 14 to secure the plate 22 to the case 14. In FIG. 3, three rows of the apertures 60 have been labeled 73 for reference purposes.

In the preferred embodiment, the aperture 53 is square shaped and the dimensions "j" and "k" are equal to 14.00 mm plus or minus 0.05 mm. The aperture 54 is rectangular in shape with "n" equal to 17.30 mm plus or minus 0.05 mm and "j" equal to 14.00 mm plus or minus 0.05 mm. The aperture 56 has the same dimensions as the aperture 53. The aperture 64 is square shaped and the dimensions "t" and "s" are equal to 10.30 mm plus or minus 0.05 mm. The aperture 68 is rectangular in shape with "r" equal to 15.30 mm plus or minus 0.05 mm and "t" equal to 10.30 mm plus or minus 0.05 mm. In other embodiments, the apertures 53, 54, 56, 64 and 68 could have other dimensions and shapes.

FIG. 4 illustrates one of the keys 18 positioned in the telephone system 10. The key 18 comprises a top part 80 having a width "a", and a base part 84 having a width "b". The width "b" of the base part 84 is greater than the width "a" of the top part 80. The top part 80 is positioned in the aperture 68 of the plate 22. Generally, the width "a" of the top part 80 is slightly less than the width "t" of the aperture 68 so that a small space exists between the top part 80 and the plate 22. This space also exists between the top part 80 and the underlay 26 and overlay 30.

The base part 84 is positioned in the aperture 70 of the case 14. Generally, the width "b" of the base part 84 is slightly less than the width "j" of the aperture 70 so that a small space exists between the base part 84 and the case 14. However, the width "b" of the base part 84 is always greater than the width "t" of the aperture 68 so that the base part 84 cannot fit into the aperture 68. The key 18 slides freely in the aperture 68 so that when the top part 80 is pressed, the key 18 moves downward causing the base part 84 to contact the key mat 38. Typically, the key mat 38 includes a raised part 88 that is depressed when the base part 84 makes contact with the raised part 88. This contact causes an electrical connection to be completed in the PCB board 42, as is well-known in the art, thereby allowing a digit of a telephone number, or a whole sequence of digits, to be dialed.

In the preferred embodiment, the keys 18 that fit in the apertures 54 (and 70) are rectangular in shape. The bottom parts of these keys have the dimensions 16.00×11.25 mm (i.e. in FIG. 4, b=11.25 mm). The top parts of these keys have the dimensions 14.00×10.00 mm (i.e. in FIG. 4, a=10.00 mm). The keys 18 that fit in the apertures 53 and 56 are square shaped. The bottom parts of these keys have the dimensions 11.25×11.25 mm. The top parts of these keys have the dimensions 10.00×10.00 mm. Preferably, the rectangular keys are "number" keys that are used to dial the individual digits of a phone number. The square keys are programmable "autodial" keys that dial an entire number associated with the key.

Examination of FIG. 4 also shows that the aperture 47 in the underlay 26 and aperture 49 in the overlay 30 have comparable dimensions to the aperture 68 of the cover plate 22. Specifically, the aperture 47 is rectangular in shape and has a width and length comparable to the width "t" and the length "r". Similarly, the aperture 49 is rectangular in shape and has a width and length comparable to the width "t" and the length "r". The apertures 47, 49 and 68 are aligned with each other to form an aperture in which the top part 80 of the key 18 is positioned. The top part 80 extends upward beyond the overlay 30 so that the key 18 can be pushed by a user of the telephone set 10.

FIG. 5 illustrates a region of the keypad 52 where the key 18 is not present in the aperture 46. In this region, the region 48 of the underlay 26 covers the aperture 60 so that the aperture 60 is not accessible from the outside of the telephone system 10. In the preferred embodiment, the underlay 26 is comprised of an opaque material such as paper so that the aperture 60 is not visible through the underlay 26. More specifically, the underlay 26 comprises 80 pound paper having a thickness of approximately 0.024 mm. The region 50 of the overlay 30 is positioned over the underlay 26. In the preferred embodiment, the overlay 30 comprises a transparent material, durable, moisture proof material, such as plastic, so that the underlay 26 can be seen through the overlay 30. The overlay 30 is durable enough to protect the underlay 26 from liquids, dirt and general wear and tear.

FIG. 6 illustrates that the base part 84 includes a plurality of indented regions 92 separated by a vertical cross member 94 and a horizontal cross member 96. The cross-members 94 and 96 engage the raised part 88 (shown in FIG. 4) when the key 18 is pressed, thereby causing a digit or number to be dialed. Additionally, FIG. 6 shows that the base part 84 extends around the entire perimeter of the key 18.

Referring to FIG. 1, the functioning of the present invention can be explained. When the telephone set 10 is assembled, the top case 14 and the bottom case 34 fit together with the key mat 38 and the PCB 42 secured inside of and between the top case 14 and the bottom case 34. The keys 18 are positioned in the apertures 46. When one of the keys 18 is depressed, it makes contact with the key mat 38, which in turn makes electrical contact with the PCB 42.

In this configuration, the keys 18 can be removed from the case 14. This is because the width "b" of the base part 84 (shown in FIG. 4) is less than the width "j" of the aperture 70. In general, the key 18 can be inserted through any of the apertures 46 from the outside of the top case 14 (note that the aperture 70 is one of the apertures 46). To prevent removal of the key 18 from the aperture 46, the cover plate 22 is positioned over the case 14 and secured to the case 14 through the fastening sites 72 and 58. The top part 80 of the key 18 extends through the aperture 68 in the plate 22. However, the bottom part 84 of the key 18 prevents the key 18 from moving into the aperture 68, thereby securing the key 18 in the top case 14.

The usefulness of the configuration just described is that it allows the plurality of keys 18 to be reconfigured without altering and/or discarding the top case 14. For example, if a certain configuration of the telephone system 10 does not require keys 18 in the apertures indicated by the numeral 59 (shown in FIG. 2), then keys 18 are not inserted in these apertures. The underlay 26 is designed with the region 48 covering the apertures in the rows 59 so that these apertures are not visible to a user of the telephone system 10. Similarly, in this configuration, the overlay 30 would include the region 50 positioned over the region 48.

At a later date, if one or more of the apertures in the rows 59 are needed, for example aperture 56, then the overlay 30 and underlay 26 are removed (these are just held in place by tabs), the cover plate 22 is removed from the case 14, and a key 18 is inserted in the aperture 56. The plate 22 is then reattached to the case 14 and a new overlay 30 and an underlay 26 having an aperture 49 and 47, respectively, cut in the region that corresponds to the aperture 56, are positioned over the plate 22.

This type of reconfiguring is useful where phones need to be customized for a particular use. For example, in a hotel, the keys that go in the apertures of rows 59 may be programmed to contact various services like room service, a health club and a dry cleaner. A second hotel may not have these services and therefore does not need keys in these positions. Using the type of procedure described above, the same phone design can be used at both locations and only the underlay 26 and overlay 30 need to be changed to accommodate both locations.

Generally, identifying indicia are printed on the underlay 26 so that a number dialed by a particular key will be indicated. For example, in FIG. 2, the key in aperture 56 might be labeled room service. Since the underlay is easily removed, one underlay 26 can easily be replaced with a new underlay 26 with different information printed on it. The overlay 30 generally comprises a transparent material so that the printing on the underlay 26 is visible to a user of the telephone set 10.

Similarly, the procedure described above is useful where, if for any reason, one of the keys 18 becomes defective. With the present invention, it can be replaced simply by removing the overlay 30 and the underlay 26 from the system 10, removing the plate 22, replacing the defective key with a new key and reassembling the plate 22, underlay 26 and overlay 30.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A telephone set comprising:

a plurality of keys including a first key having a bottom part;

a telephone case having a plurality of telephone case apertures that extend entirely through a surface of the telephone case, the plurality of telephone case apertures including a first telephone case aperture containing at least a portion of the bottom part of the first key and sized so that the bottom part of the first key will fit inside of the first telephone case aperture; and a cover plate positioned on top of the telephone case and having a plurality of cover plate apertures extending entirely through the cover plate, the plurality of cover plate apertures including a first cover plate aperture that is positioned over the first telephone case aperture, the first cover plate aperture being sized so that the first key cannot be withdrawn through the first cover plate aperture, wherein separation of the cover plate from the telephone case enables unhindered passage of the bottom part of the first key through the first telephone case aperture.

2. A telephone set comprising:

a plurality of keys including a first key having a top part and a bottom part, the top part having a top width "a" and the bottom part having a bottom width "b" which is greater than the top width "a";

a telephone case having a plurality of telephone case apertures that extend entirely through a surface of the telephone case, the plurality of telephone case apertures including a first telephone case aperture containing at least a portion of the bottom part of the first key and having a width "j" and a length "n", the width "j" and the length "n" being selected so that the bottom part of the first key will fit inside of the first telephone case aperture; and a cover plate positioned on top of the telephone case and having a plurality of cover plate apertures extending entirely through the cover plate, the plurality of cover plate apertures including a first cover plate aperture that is positioned over the first telephone case aperture, the first cover plate aperture having a width "t" and a length "r" with the width "t" being less than the width "b" of the bottom part of the first key so that the first key cannot be withdrawn through the first cover plate aperture, wherein separation of the cover plate from the telephone case enables unhindered passage of the bottom part of the first key through the first telephone case aperture.

3. The telephone set of claim 2 further comprising:

an underlay positioned over the cover plate and having a plurality of underlay apertures extending entirely through the underlay, the plurality of underlay apertures including a first underlay aperture positioned over the first cover plate aperture.

4. The telephone set of claim 3 wherein the underlay includes a region that covers at least one of the plurality of cover plate apertures.

5. The telephone set of claim 3 further comprising:

an overlay positioned over the underlay and having a plurality of overlay apertures extending entirely through the overlay, the plurality of overlay apertures including a first overlay aperture positioned over the first underlay aperture.

6. The telephone set of claim 2 wherein the bottom width "b" of the first key is approximately 11.25 mm.

7. The telephone set of claim 2 wherein the width "j" of the first telephone case aperture is approximately 14.0 millimeters.

8. The telephone set of claim 2 wherein the width "t" of the first cover plate aperture is approximately 10.3 millimeters.

9. The telephone set of claim 2 wherein the cover plate is comprised of plastic.

10. The telephone set of claim 3 wherein the underlay is comprised of paper.

11. The telephone set of claim 3 further comprising printing on the underlay that identifies a telephone number that is dialed when one of the keys is pressed.

12. The telephone set of claim 5 wherein the overlay is comprised of transparent plastic.

13. The telephone set of claim 2 further comprising:

a second key which is one of the plurality of keys, the second key having a top part and a bottom part, the top part having a width "e" that is equal to the width "a" of the first key, and the bottom part having a width "f" that is equal to the width "b" of the first key;

a second telephone case aperture which is one of the plurality of telephone case apertures, the second telephone case aperture having a width "g" that is equal to the width "j" of the first telephone case aperture, and a length "h" that is equal to the length "n" of the first telephone case aperture; and a second cover plate aperture which is one of the plurality of cover plate apertures and that is positioned over the second telephone case aperture, the second cover plate aperture having a width "x" that is equal to the width "t" of the first cover plate aperture, and a length "y" that is equal to the length "r" of the first cover plate aperture.

14. A telephone set comprising:

a plurality of keys including a first key having a top part and a bottom part, the top part having a top width "a" and the bottom part having a bottom width "b" which is greater than the top width "a";

a telephone case having a plurality of telephone case apertures that extend entirely through a surface of the telephone case, the plurality of telephone case apertures including a first telephone case aperture containing at least a portion of the bottom part of the first key and having a width "j" and a length "n", the width "j" and the length "n" being selected so that the bottom part of the first key will fit inside of the first telephone case aperture;

a cover plate positioned on top of the telephone case and having a plurality of cover plate apertures extending entirely through the cover plate, the plurality of cover plate apertures including a first cover plate aperture that is positioned over the first telephone case aperture, the first cover plate aperture having a width "t" and a length "r" with the width "t" being less than the width "b" of the bottom part of the first key so that the first key cannot be withdrawn through the first cover plate aperture;

an underlay positioned over the cover plate and having a plurality of underlay apertures extending entirely through the underlay, the plurality of underlay apertures including a first underlay aperture positioned over the first cover plate aperture; and an overlay positioned over the underlay and having a plurality of overlay apertures extending entirely through the overlay, the plurality of overlay apertures including a first overlay aperture positioned over the first underlay aperture, wherein separation of the cover plate from the telephone case enables unhindered passage of the bottom part of the first key through the first telephone case aperture.

15. The telephone set of claim 14 wherein the bottom width "b" of the first key is approximately 11.25 mm.

16. The telephone set of claim 14 wherein the width "j" of the first telephone case aperture is approximately 14.0 millimeters.

17. The telephone set of claim 14 wherein the width "t" of the first cover plate aperture is approximately 10.3 millimeters.

18. The telephone set of claim 14 wherein the cover plate is comprised of plastic.

19. The telephone set of claim 14 wherein the underlay is comprised of paper.

20. The telephone set of claim 14 wherein the overlay is comprised of transparent plastic.

* * * * *